(12) United States Patent
Gopalarathnam et al.

(10) Patent No.: US 11,012,304 B1
(45) Date of Patent: May 18, 2021

(54) NETWORKING DEVICE REPLACEMENT SYSTEM

(71) Applicant: Dell Products L.P., Round Rock, TX (US)

(72) Inventors: Sudharsan Dhamal Gopalarathnam, Redmond, WA (US); Kannan Karuppiah, Santa Clara, CA (US); Mark Steven Sanders, Roanoke, VA (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 16/751,612

(22) Filed: Jan. 24, 2020

(51) Int. Cl.
*G06F 15/173* (2006.01)
*H04L 12/24* (2006.01)
*H04L 29/08* (2006.01)
*H04L 29/12* (2006.01)

(52) U.S. Cl.
CPC ...... *H04L 41/0846* (2013.01); *H04L 61/2015* (2013.01); *H04L 61/6022* (2013.01); *H04L 67/1068* (2013.01); *H04L 67/34* (2013.01)

(58) Field of Classification Search
CPC ............ H04L 41/0846; H04L 67/1068; H04L 61/2015; H04L 61/6022; H04L 67/34
See application file for complete search history.

(56) References Cited

U.S. PATENT DOCUMENTS

| | | | | |
|---|---|---|---|---|
| 6,757,552 | B1* | 6/2004 | Garcia-Martin | H04Q 3/0029 370/352 |
| 6,882,638 | B1* | 4/2005 | Garcia-Martin | H04Q 3/0025 370/352 |
| 7,054,326 | B1* | 5/2006 | Garcia-Martin | H04Q 3/0025 370/410 |
| 2004/0103147 | A1* | 5/2004 | Flesher | G06F 16/27 709/204 |
| 2006/0095338 | A1* | 5/2006 | Seidel | G06Q 30/02 705/26.8 |
| 2007/0130070 | A1* | 6/2007 | Williams | G06F 21/602 705/50 |
| 2007/0258467 | A1* | 11/2007 | Bourne | H04L 67/28 370/400 |
| 2015/0348192 | A1* | 12/2015 | Broder | G06Q 40/04 705/36 R |

* cited by examiner

*Primary Examiner* — Thanh T Nguyen
(74) *Attorney, Agent, or Firm* — Haynes and Boone, LLP (57) ABSTRACT

A networking device replacement system, includes a second networking device coupled to the configuration server system and the first networking device. The second networking device sends a first peer discovery request to the first networking device that includes second networking device identifying information associated with the second networking device and, in response, receives a first peer discovery response that includes third networking device identifying information associated with a third networking device that the second networking device is replacing. The second networking device sends a first configuration server discovery request to the configuration server system that includes the third networking device identifying information and receives a third networking device configuration file associated with the third networking device. The second networking device configures itself using at least one configuration in the third networking device configuration file.

20 Claims, 9 Drawing Sheets

NETWORKING DEVICE REPLACEMENT SYSTEM

BACKGROUND

The present disclosure relates generally to information handling systems, and more particularly to replacing networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switches, routers, and/or other networking devices known in the art, are often connected to each another to form a network. In the event one the networking devices in the network fails or experiences degraded performance, that networking device is often replaced with another networking device as a part of Return Merchandise Authorization (RMA) replacement operations, which typically include swapping out the networking device with a replacement networking device having a same or similar model/make. When performing the RMA replacement operations, it may be desirable to provide a configuration for the replacement networking device that matches a configuration of the networking device being replaced. However, a Media Access Control (MAC) address and hostname of the replacement networking device will be different than the MAC and the hostname of the networking device being replaced. Thus, in order to provide the configuration of a "previous" networking device on a replacement networking device via a Dynamic Host Configuration Protocol (DHCP) server, the different MAC address and/or hostname of the replacement networking device needs to be provided to the DHCP server. For example, in the DHCP server, the MAC address of the replacement networking device may need to be mapped with the configuration of the MAC address of the networking device, and/or the hostname of the replacement networking device being replaced may need to be changed to the hostname of the replacement networking device. In either case, manual intervention and configuration is required for RMA replacement operations that replace a networking device with a replacement networking device, which is time consuming and subject to user errors.

Accordingly, it would be desirable to provide an improved networking device replacement system.

SUMMARY

According to one embodiment, an Information Handling System (IHS) includes a processing system; and a memory system that is coupled to the processing system and that includes instructions that, when executed by the processing system, cause the processing system to provide a replacement engine configured to: send a first peer discovery request to a first networking device, wherein the first peer discovery request includes IHS identifying information associated with the IHS; receive, from the first networking device, a first peer discovery response that includes second networking device identifying information associated with a second networking device; send a first configuration server discovery request to a configuration server system that includes the second networking device identifying information; receive, from the configuration server system, a second networking device configuration file associated with the second networking device; and configure the IHS using at least one configuration in the configuration file.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
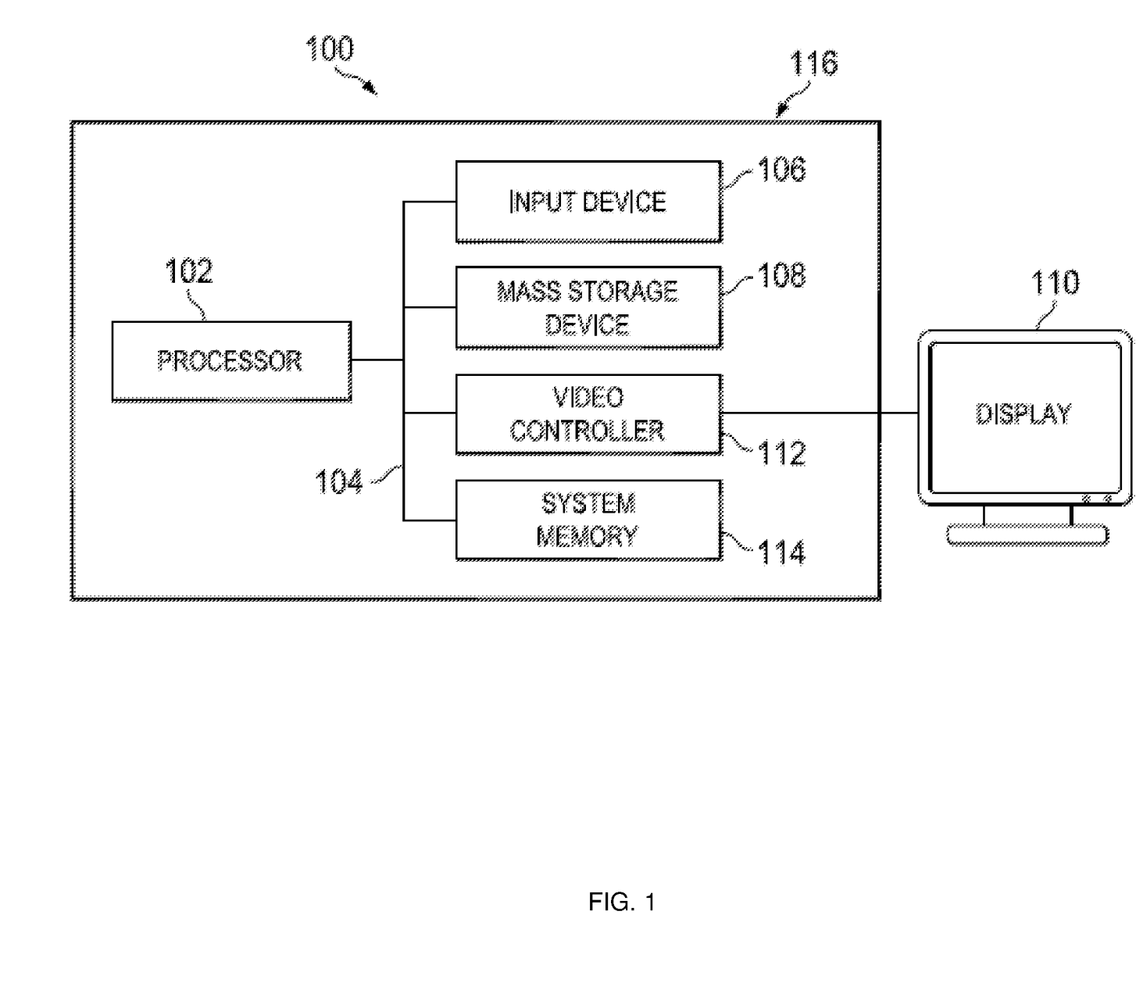
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
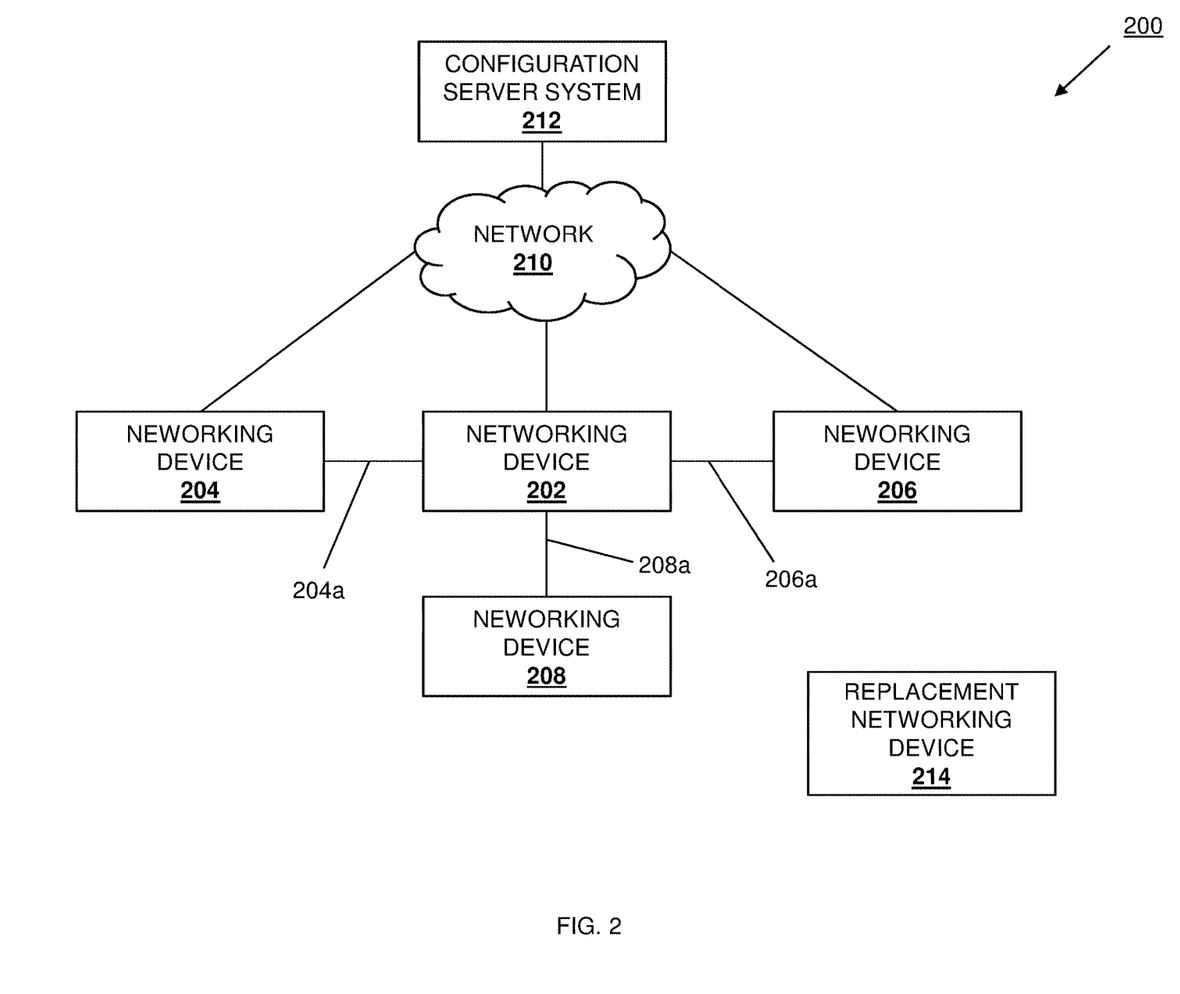
FIG. 2 is a schematic view illustrating an embodiment of a networking device replacement system.

Referring now to FIG. 2, an embodiment of a networking device replacement system 200 is illustrated. In the illustrated embodiment, the networking device replacement system 200 includes a plurality of networking devices 202, 204, 206, and/or up to 208. In an embodiment, any or all of the networking devices 202-208 may be provided by the IHS 100 discussed above with reference to FIG. 1, and/or may include some or all of the components of the IHS 100. In specific examples, the networking devices 202-208 may include switch devices, router devices, gateway devices, and/or any other networking device that would be apparent to one of skill in the art in possession of the present disclosure. In the illustrated embodiment, the networking device 202 may be coupled to the networking device 204 via a link 204a, and the link 204a may include one or more links and/or physical connections that are each provided between a port on the networking device 204 and a port on the networking device 202. Similarly, the networking device 202 may be coupled to the networking device 206 via a link 206a, and the link 206a may include one or more links and/or physical connections that are each provided between a port on the networking device 206 and a port on the networking device 202. Similarly as well, the networking device 202 may be coupled to the networking device 208 via a link 208a, an the link 208a may include one or more links and/or physical connections that are each provided between a port on the networking device 208 and a port on the networking device 202.

In some embodiments, each of the networking devices 204, 206 and/or 208 may be referred to as "peer" networking devices or "neighboring" networking devices with respect to the networking device 202. In the illustrated embodiment, each of the networking devices 202-208 may be coupled to a network 210 which may be provided by a LAN in the examples below. However, other types of networks (e.g., the Internet) may be utilized in the networking device replacement system 200 while remaining within the scope of the present disclosure as well. While the plurality of networking devices 202, 204, 206, and/up to 208 are illustrated and described as being provided in the networking device replacement system 200 in a particular topology, one of skill in the art in possession of the present disclosure will recognize that two or more networking devices in any topology will benefit from the teachings of the present disclosure and thus may fall within its scope as well.

In the illustrated embodiment, a configuration server system 212 is also coupled to the network 210. In an embodiment, the configuration server system 212 may be provided by the IHS 100 discussed above with reference to FIG. 1, and/or may include some or all of the components of the IHS 100. In specific examples, the configuration server system 212 may include one or more Dynamic Host Configuration Protocol (DHCP) server devices and/or other configuration computing devices that would be apparent to one of skill in the art in possession of the present disclosure. In the illustrated embodiment, the networking device replacement system 200 also includes a replacement networking device 214. In an embodiment, the replacement networking device may be provided by the IHS 100 discussed above with reference to FIG. 1, and/or may include some or all of the components of the IHS 100. In specific examples, the replacement networking device 214 may include a switch device, a router device, a gateway device, and/or any other networking device that would be apparent to one of skill in the art in possession of the present disclosure. As illustrated, the replacement networking device 214 may not be initially coupled to any of the networking devices 204-208, the network 210, and/or the configuration server system until it is provided to replace one of the networking device 202-208, discussed in further detail below. However, while a specific networking device replacement system 200 has been illustrated and described, one of skill in the art in possession of the present disclosure will recognize that the functionality of the networking device replacement system of the present disclosure may be enabled by a variety of devices and/or systems in a variety of configurations that will fall within the scope of the present disclosure as well.

Figure 3:
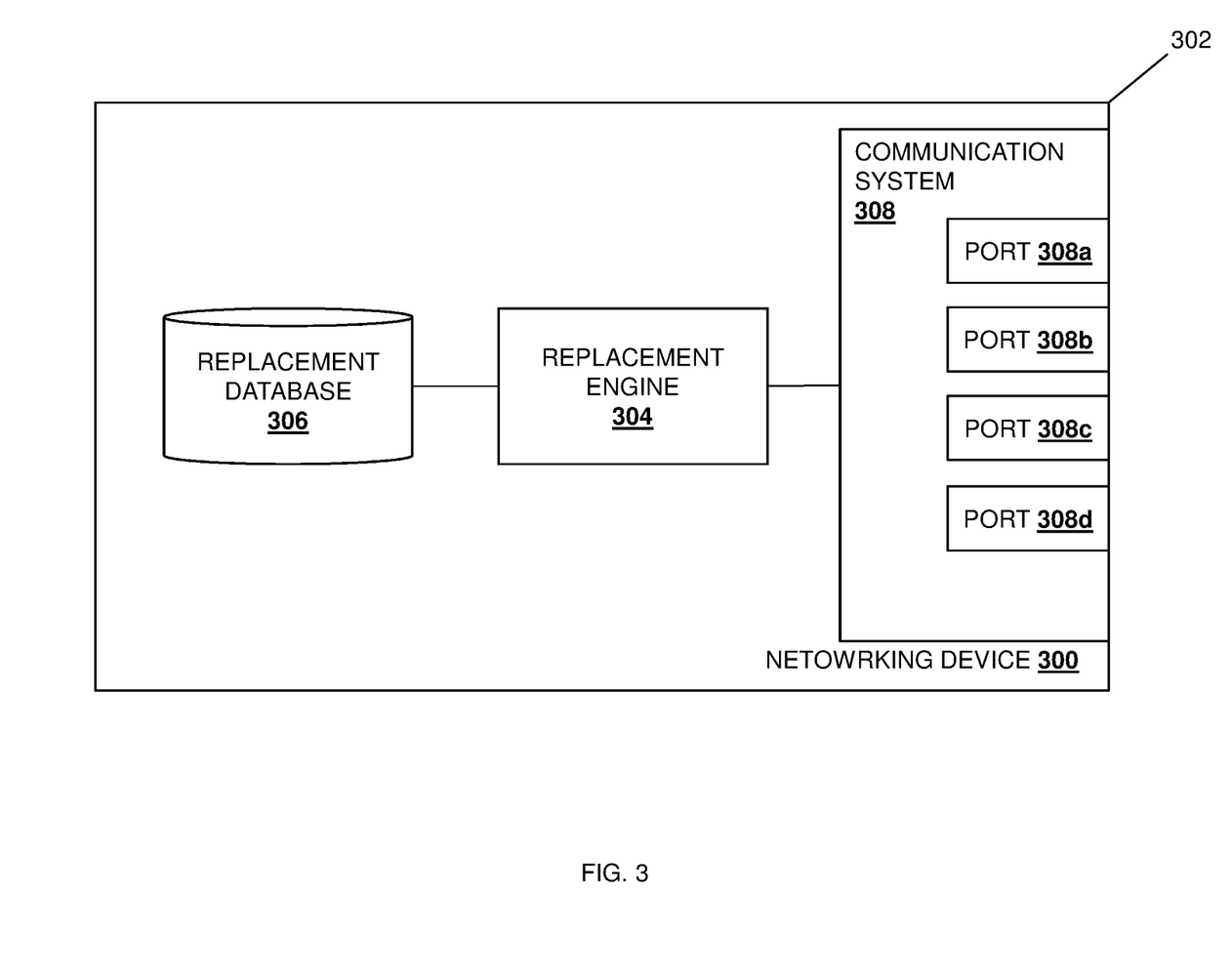
FIG. 3 is a schematic view illustrating an embodiment of a networking device used in the networking device replacement system of FIG. 2.

Referring now to FIG. 3, an embodiment of a networking device 300 is illustrated that may provide any or all of the networking devices 202, 204, 206, and/or 208 discussed above with reference to FIG. 2. As such, the networking device 300 may be provided by the IHS 100 discussed above with reference to FIG. 1 and/or may include some or all of the components of the IHS 100, and in specific examples may be provided by a switch device, a router device, a gateway device and/or other networking devices that would be apparent to one of skill in the art in possession of the present disclosure. Furthermore, while illustrated and discussed as a switch device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a replacement engine 304 that is configured to perform the functionality of the replacement engines and/or networking devices discussed below.

The chassis 302 may also house a storage system (not illustrated, but which may include the storage 108 discussed above with reference to FIG. 1) that is coupled to the replacement engine 304 (e.g., via a coupling between the storage system and the processing system) and that includes a replacement database 306 that is configured to store any of the information utilized by the replacement engine 304 discussed below. For example, the replacement database 306 may include a Link Layer Discovery Protocol (LLDP) database that stores identifying information associated with peer/neighboring networking devices. The chassis 302 may also house a communication system 308 that is coupled to the replacement engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 308 may include any of the interfaces and/or ports discussed below that provide the links between the networking devices, and in the illustrated example include a port 308a, a port 308b, a port 308c, and up to a port 308d. However, while a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
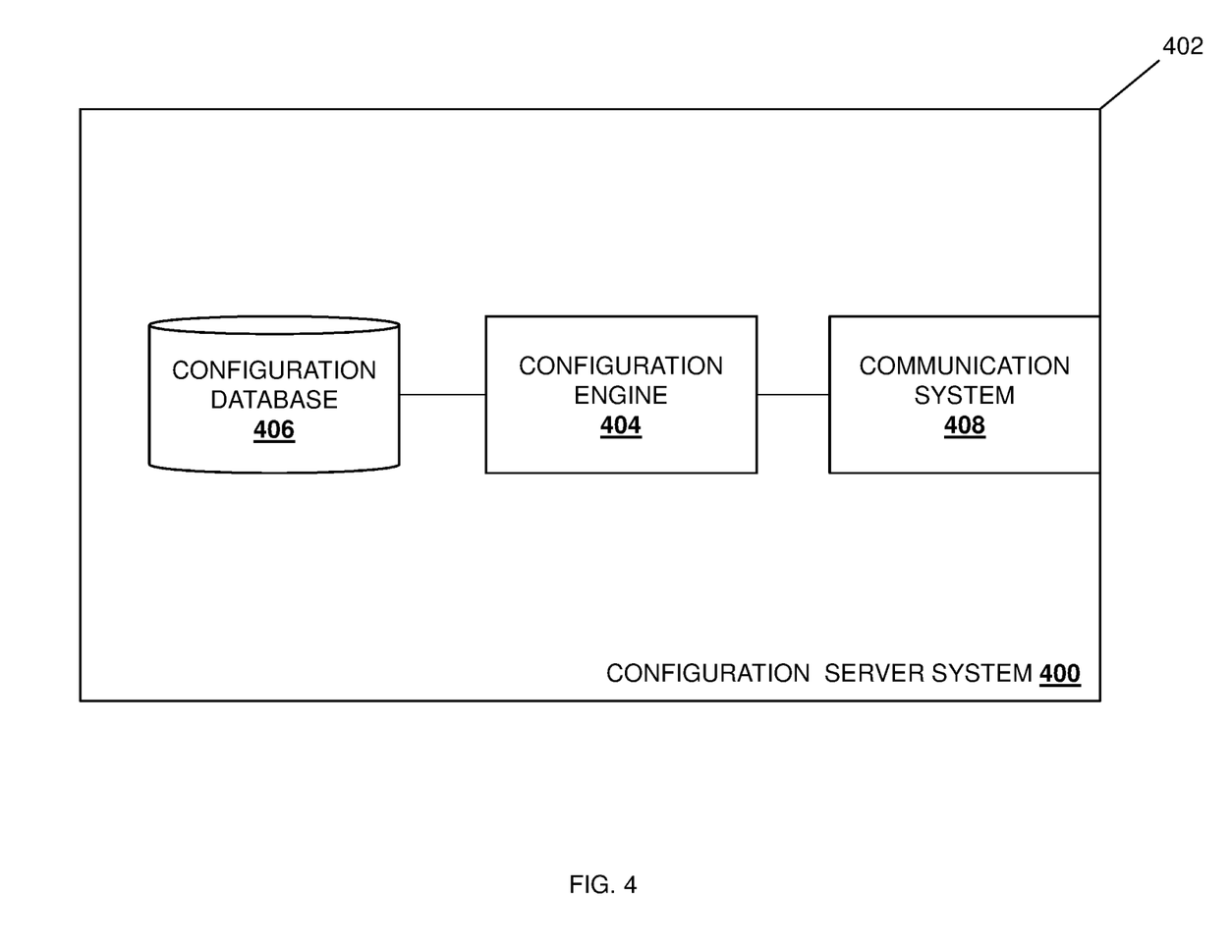
FIG. 4 is a schematic view illustrating an embodiment of a configuration server system used in the networking device replacement system of FIG. 2.

Referring now to FIG. 4, an embodiment of a configuration server system 400 is illustrated that may provide the configuration server system 212 discussed above with reference to FIG. 2. As such, the configuration server system 400 may be the IHS 100 discussed above with reference to FIG. 1 and/or may include some or all of the components of the IHS 100, and in specific examples may include one or more Dynamic Host Configuration Protocol (DHCP) server devices and/or other configuration computing devices that would be apparent to one of skill in the art in possession of the present disclosure. In the illustrated embodiment, the configuration server system 400 includes a chassis 402 that houses the components of the configuration server system 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a configuration engine 404 that is configured to perform the functionality of the configuration engines and configuration server systems discussed below.

The chassis 402 may also house a storage system (not illustrated, but which may include the storage device 108 discussed above with reference to FIG. 1) that is coupled to the configuration engine 404 (e.g., via a coupling between the storage system and the processing system) and that includes a configuration database 406 that is configured to store any of the data and/or other information utilized by the configuration engine 404 as described below. The chassis 402 may also house a communication system 408 that is coupled to the configuration engine 404 (e.g., via a coupling between the communication system 408 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 210 of FIG. 2) discussed below. However, while a specific configuration server system 300 has been illustrated and described, one of skill in the art in possession of the present disclosure will recognize that configuration server systems (e.g., DCHP servers) may include a variety of components and component configurations that would enable the functionality discussed below while remaining within the scope of the present disclosure.

Figure 5:
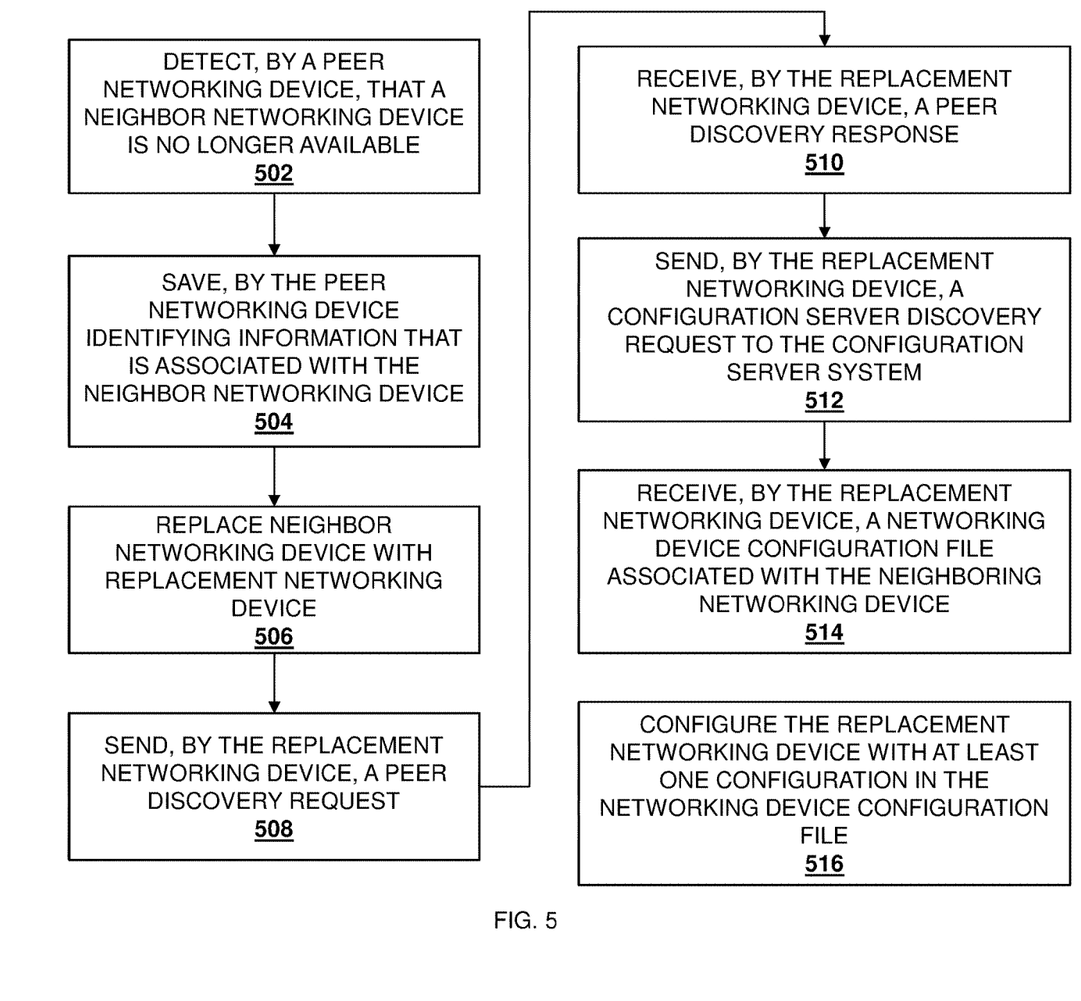
FIG. 5 is a flow chart illustrating an embodiment of a method for replacing a networking device.

Referring now to FIG. 5, an embodiment of a method 500 for replacing a networking device is illustrated. As discussed below, the systems and methods of the present disclosure provide for the replacement of a "previous" networking device with a replacement networking device without the need for manual intervention or operations associated with conventional networking device replacement systems. For example, when the previous networking device becomes unavailable or is no longer detected by any peer networking devices that are coupled to the previous networking device, each of the peer networking devices may save previous networking device identifying information (e.g., a MAC address and/or hostname) associated with the previous networking device. When a peer networking device detects a replacement networking device on the same link that was previously connected to the previous networking device via the detection of replacement networking device identifying information that is different than the previous networking device identifying information, each peer networking device sends the previous networking device identifying information to the replacement networking device. The replacement networking device may then send the previous networking device identifying information to a configuration server system (e.g., a DHCP server). The configuration server system may then use the previous networking device identifying information to provide the replacement networking device a previous networking device configuration file that is associated with the previous networking device. The replacement networking device may then configure itself with at least one configuration provided in the previous networking device configuration file so that network data traffic may be transmitted via the replacement networking device in substantially the same manner as it was transmitted via the previous networking device. As such, networking device replacement may be performed quickly to limit data loss, and without the need for extensive manual user configuration operations associated with conventional networking device replacement systems.

The method 500 begins at block 502 where a peer networking device detects that a networking device to which the peer networking device is connected is no longer available. In an embodiment, at block 502, the replacement engine 304 in the networking device 204 may determine that the link 204a between the networking device 204 and the networking device 202 is no longer available. For example, the link 204a may go down due to an administrator disconnecting one or more cables between one or more ports on the networking device 204 and one or more ports on the networking device 202. In another example, the link 204a may become no longer available when the networking device 202 powers down, fails, or otherwise becomes unavailable in a variety of manners that would be apparent to one of skill in the art in possession of the present disclosure.

Similarly, the replacement engine 304 in the networking device 206 may determine that the link 206a between the networking device 206 and the networking device 202 is no longer available. For example, the link 206a may go down due to an administrator disconnecting one or more cables between one or more ports on the networking device 206 and one or more ports on the networking device 202. In another example, the link 206a may become no longer available when the networking device 202 powers down, fails, or otherwise becomes unavailable in a variety of manners that would be apparent to one of skill in the art in possession of the present disclosure.

Figure 6A:
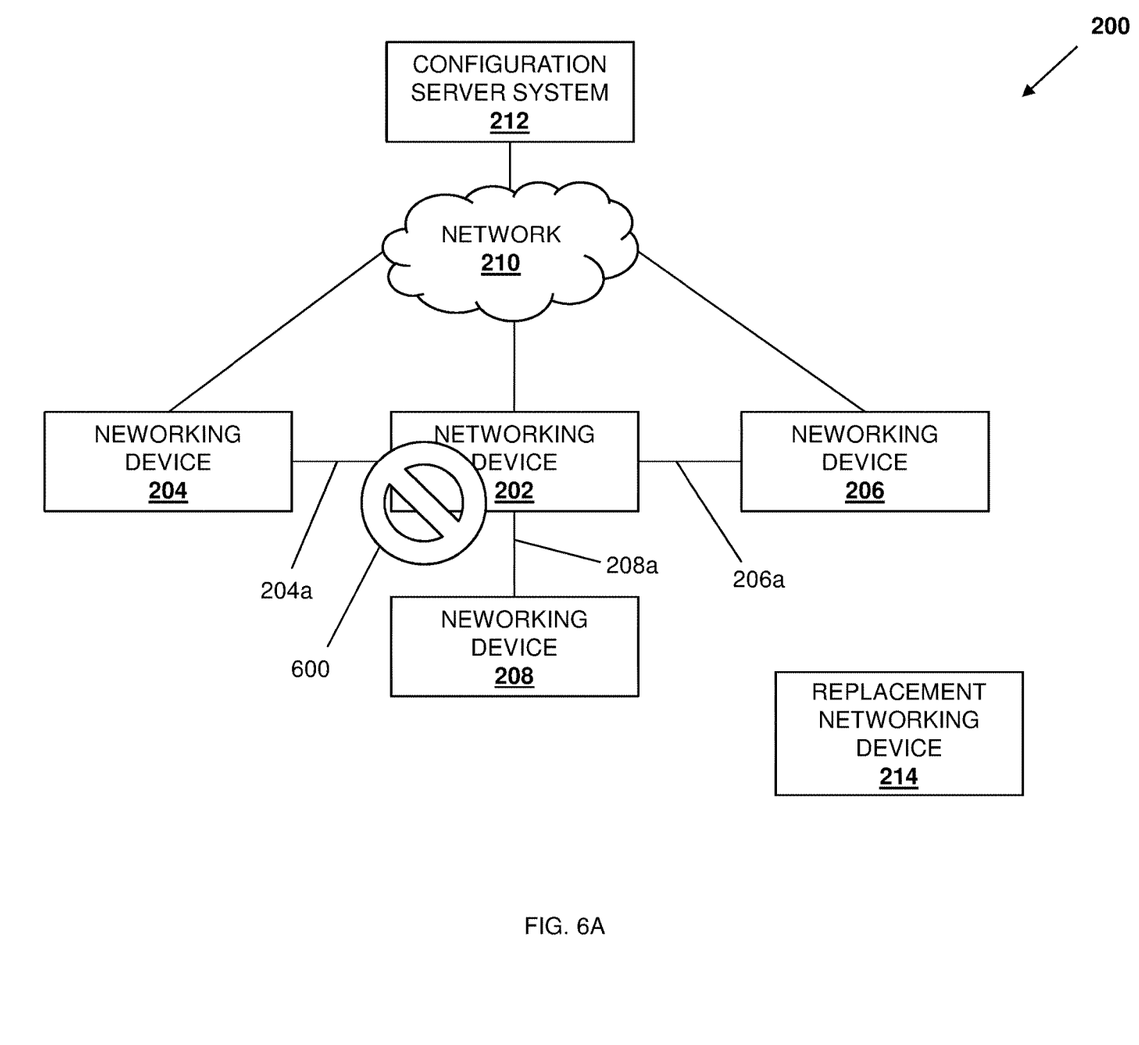
FIG. 6A is a block diagram illustrating an embodiment of the networking device replacement system of FIG. 2 operating during the method of FIG. 5.

Similarly, as well, the replacement engine 304 in the networking device 208 may determine that the link 208a between the networking device 208 and the networking device 202 is no longer available. For example, the link 208a may go down due to an administrator disconnecting one or more cables between one or more ports on the networking device 208 and one or more ports on the networking device 202. In another example, the link 208a may become no longer available when the networking device 202 powers down, fails, or otherwise becomes unavailable in a variety of manners that would be apparent to one of skill in the art in possession of the present disclosure. Referring to the example illustrated in FIG. 6A, the networking device 202 is illustrated as having become unavailable (as indicated by element 600), resulting in the determinations by the networking devices 204, 206 and 208 that their respective links 204a, 206a, and 208a to the networking device 202 have become unavailable.

The method 500 then proceeds to block 504 where the peer networking device saves previous networking device identifying information that is associated with the previous networking device. In an embodiment, at block 504, the replacement engine 304 in the networking device 204 may save previous networking device identifying information associated with the networking device 202, which may include networking device specific identifying information such as, for example, a MAC address and/or a hostname of the networking device 202. In some examples, the MAC address of the networking device 202 may include a system MAC address for the networking device 202 rather than the MAC addresses for the individual ports 308a-308d provided by the communication system 308 in the networking device 204. In other examples, the previous networking device identifying information may include general networking device identifying information such as, for example, a type of the networking device 202, a make of the networking device 202, a vendor name associated with the networking device 202, capability information associated with the networking device 202, and/or any other identifying information about the previous networking device that would be apparent to one of skill in the art in possession of the present disclosure. In some embodiments, the previous networking device identifying information may be obtained from an LLDP database and stored separately in the replacement database 306 in the networking device 204. The replacement engine 304 in the networking device 204 may then map port identifier(s) for the port(s) in the communication system 308 of the networking device 204 that was/were coupled to the communication system 308 in the networking device 202 with the previous device identifying information, and store the mapping(s) of the port identifier(s) and the previous networking device identifying information in the replacement database 306 in the networking device 204.

Similarly, the replacement engine 304 in the networking device 206 may also save the previous networking device identifying information associated with the networking device 202, which as discussed above may be obtained from an LLDP database and stored separately in the replacement database 306 in the networking device 206. The replacement engine 304 in the networking device 206 may also map port identifier(s) for the port(s) in the communication system 308 in the networking device 206 that was/were coupled to the communication system 308 in the networking device 202 with the previous device identifying information, and store the mapping(s) of the port identifier(s) and the previous networking device identifying information in the replacement database 306 of the networking device 206.

Similarly, as well, the replacement engine 304 in the networking device 208 may also save the previous networking device identifying information associated with the networking device 202, which as discussed above may be obtained from an LLDP database and stored separately in the replacement database 306 of the networking device 208. The replacement engine 304 in the networking device 206 may also map port identifier(s) for the port(s) in the communication system 308 in the networking device 208 that was/were coupled to the communication system 308 in the networking device 202 with the previous device identifying information, and store the mapping(s) of the port identifier(s) and the previous networking device identifying information in the replacement database 306 of the networking device 208.

Figure 6B:
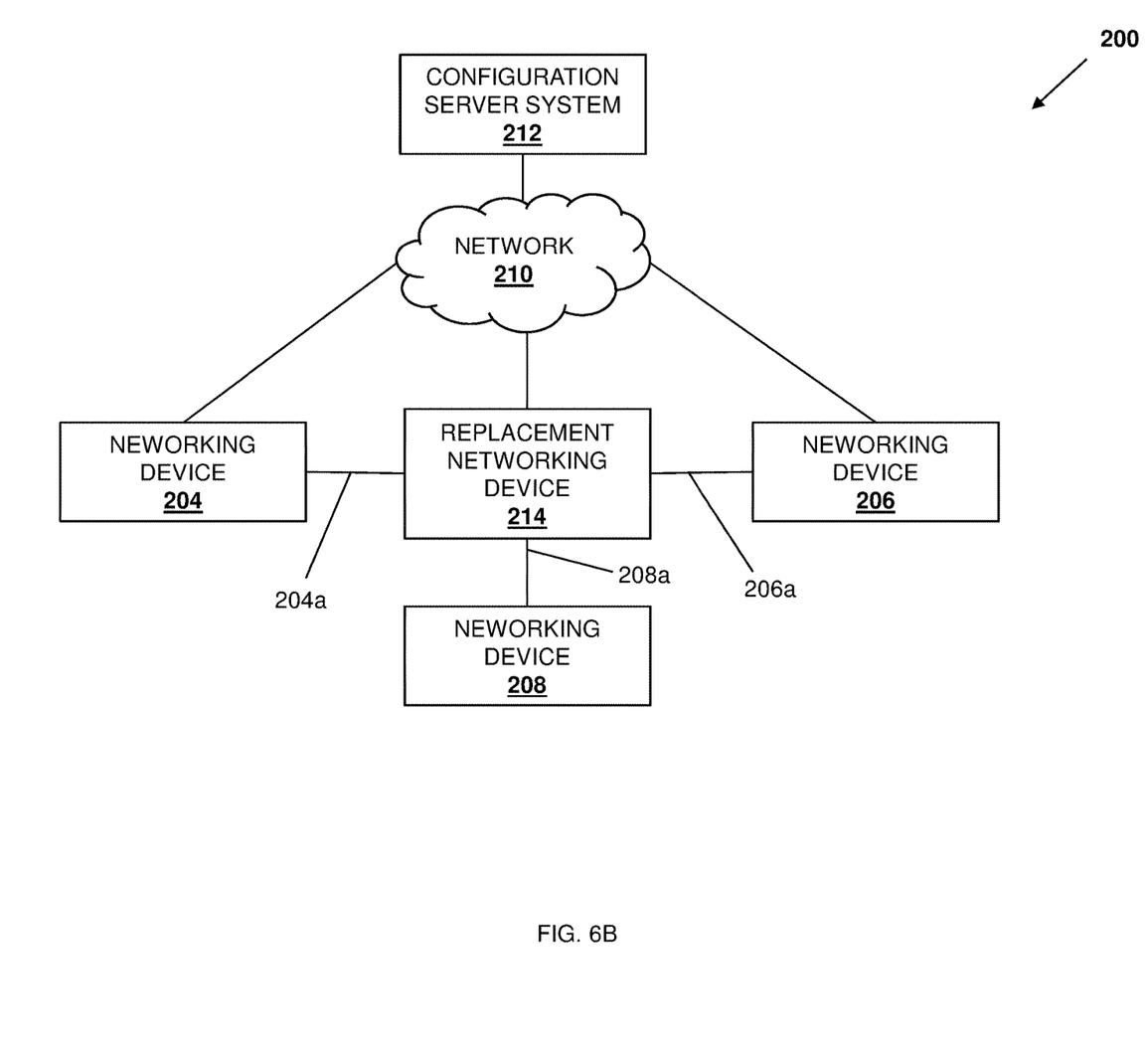
FIG. 6B is a block diagram illustrating an embodiment of the networking device replacement system of FIG. 2 operating during the method of FIG. 5.

The method 500 then proceeds to block 506 where the previous networking device is replaced with the replacement networking device. In an embodiment, at block 506, the networking device 202 (which is the original networking device that was provided in the networking device replacement system 200 and that became unavailable at block 502) may be replaced with the replacement networking device 214. As illustrated in FIG. 6B, an administrator may provide one or more of the links 204a, 206a, or 208a coupled to the respective networking devices 204, 206, and 208 to the replacement networking device 214 by, for example, physically connecting the cabling that provides those links 204a, 206a, and 208a to the replacement networking device 214.

Figure 7:
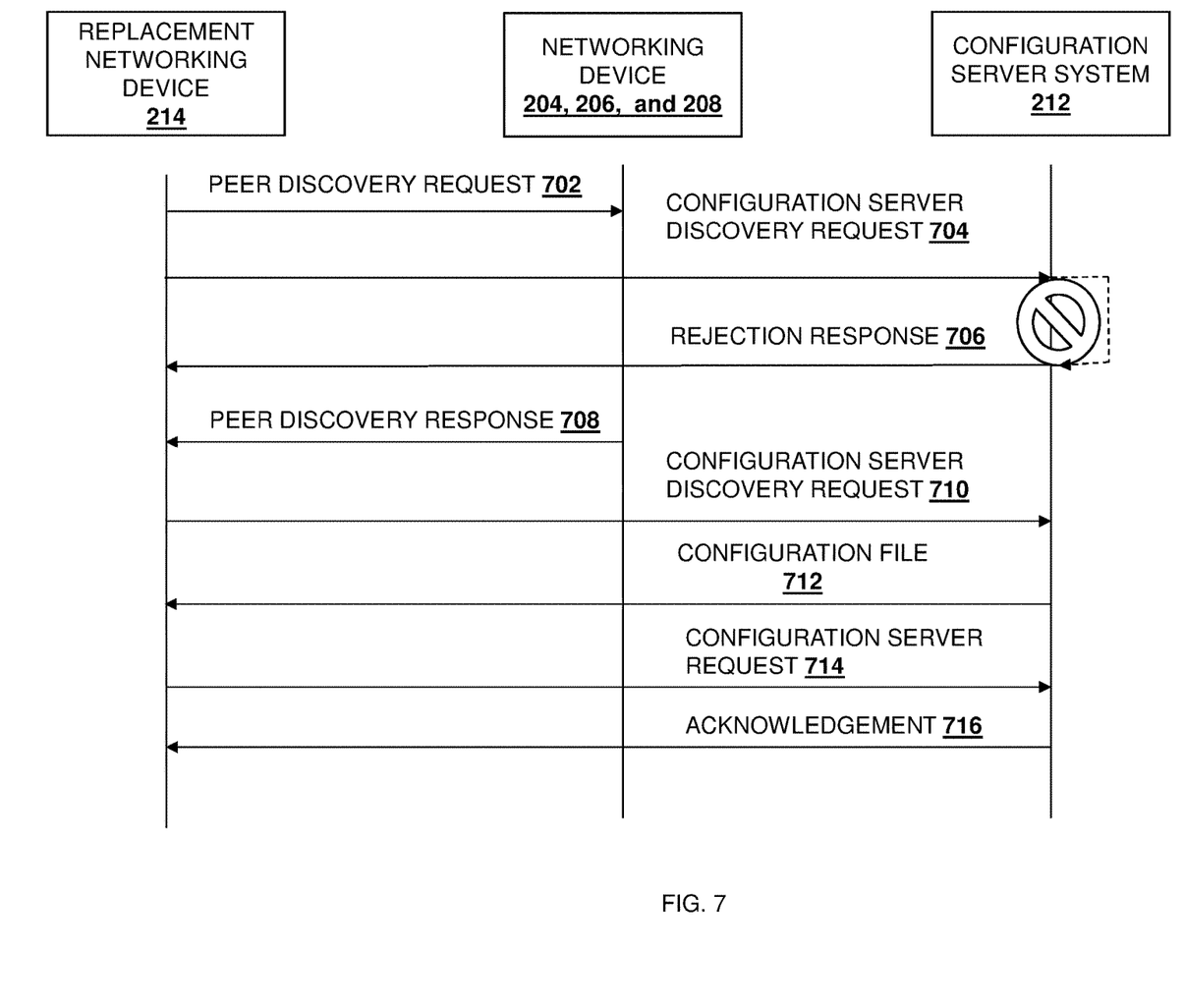
FIG. 7 is a swim-lane diagram illustrating an embodiment of the networking device replacement system of FIG. 2 operating during the method of FIG. 5.

The method 500 then proceeds to block 508 where a replacement networking device sends a peer discovery request, which includes replacement networking device identifying information that is associated with the replacement networking device, to any peer networking devices. In an embodiment, at block 508, the replacement networking device 214 may boot and enter a provisioning mode such as, for example, a bare metal provisioning (BMP) mode, a DHCP initial configuration stage, a Zero-Touch Deployment (ZTD) mode, and/or any other provisioning mode that would be apparent to one of skill in the art in possession of the present disclosure. As illustrated in FIG. 7, the replacement networking device 214 may provide peer discovery requests 702 (e.g., provide in LLDP packets) to each of the networking devices 204, 206, and/or up to 208 via each respective connection (e.g., link 204a, 206a, and/or up to 208a) with those networking devices 204, 206, and/or up to 208. In an embodiment, each peer discovery request 702 may include replacement networking device identifying information associated with the replacement networking device 214 such as, for example, networking device specific identifying information including a MAC address and/or a hostname associated with the replacement networking device 214. For example, the MAC address provided by the replacement networking device 214 may include a system MAC address for the replacement networking device 214, rather than the MAC addresses for the individual ports 308a-308d included in the communication system 308 in the replacement networking device 214. In other examples, the replacement device identifying information may include general networking device identifying information such as, for example, a type of the replacement networking device 214, a make of the replacement networking device 214, a vendor name of the replacement networking device 214, and/or any other identifying information about the replacement networking device 214 that would be apparent to one of skill in the art in possession of the present disclosure.

In some examples, the replacement networking device 214 may send a configuration server discovery request 704 via the network 210 to the configuration server system 212. In an embodiment, the configuration server discovery request 704 may include the replacement device identifying information and a request for a configuration file for the replacement networking device 214. However, because the configuration server system 212 does not include a configuration file associated with the replacement device identifying information (e.g., the configuration server system 212 does not include a configuration file associated with the MAC address and/or hostname of the replacement networking device 214) in its configuration database 406, the configuration server system 212 may ignore the configuration server discovery request 704, or may send a rejection response 706.

Figure 8:
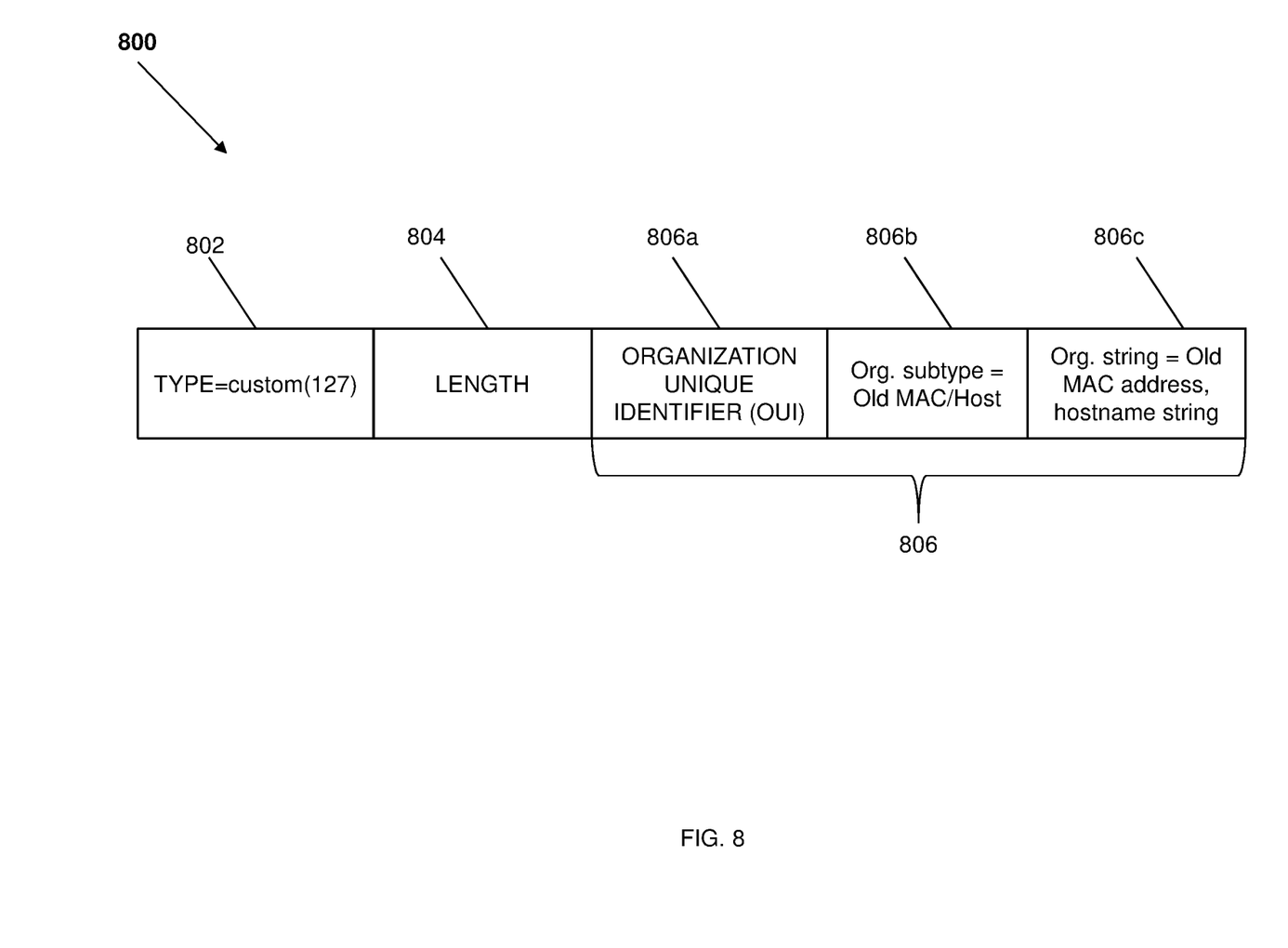
FIG. 8 is a block diagram illustrating an embodiment of a Time Length Value (TLV) included in a peer discovery response packet used by the networking device replacement system of FIG. 2 operating during the method of FIG. 5.

The method 500 then proceeds to block 510 where the replacement networking device receives a peer discovery response that includes previous networking device identifying information associated with the previous networking device. In an embodiment, at block 510 and with reference to FIG. 7, in response to the peer discovery request 702, the replacement networking device 214 may receive a peer discovery response 708 from each of the networking devices 204, 206, and/or up to 208. For example, the peer discovery response may include previous networking device identifying information (e.g., a MAC address and/or hostname) associated with the networking device 202. In a specific example, the peer discovery response 708 may include a custom Type-Length-Value (TLV) element within an LLDP packet. With reference to FIG. 8, a custom TLV element 800 is illustrated, and includes a type field 802, a length field 804, and a value field 806. The value field 806 may include an Organization Unique Identifier (OUI) field 806a for a vendor of the networking device 202, and a field 806b identifying that string values in an organization defined information string field 806c are for the MAC address and hostname of the previous networking device (e.g., the networking device 202). Furthermore, if a calculated length of the value in the organization defined information string field 806c is 6 octets, that may indicate that there was no hostname for the networking device 202, and the organization defined information string field 806c may include the MAC address of the networking device 202. However, if the calculated length of the value in the organization defined information string field 806c is more than 6 octets, that may indicate that a hostname will be present in the organization defined information string field 806c following 6 octets of the MAC address.

In some embodiments, prior to sending the peer discovery response 708 and in response to receiving the peer discovery request 702, each networking device 204, 206, and/or up to 208 may perform a replacement verification process that verifies that the replacement networking device 214 is a networking device that is replacing the networking device 202 (e.g., that the replacement networking device 214 is a RMA replacement rather than part of a topology change in the networking device replacement system 200) before sending the peer discovery response 708 that includes the previous networking device identifying information. For example, the replacement verification process may determine whether one or more conditions are satisfied before sending the peer discovery response 708. In a specific example, each networking device 204, 206, and/or up to 208 may determine whether the MAC address and/or the hostname in the replacement networking device identifying information associated with the replacement networking device 214 is different than the MAC address and/or the hostname in the previous networking device identifying information associated with the networking device 202. In the event the MAC address and/or the hostname in replacement networking device identifying information is different than the MAC address and/or the hostname in the previous networking device identifying information, then the replacement engine 304 of the networking device 204, 206, and/or up to 208 may send the peer discovery response 708. However, in the event the MAC address and/or the hostname in the replacement networking device identifying information is the same as the MAC address and/or the hostname in the previous networking device identifying information, then the replacement engine 304 of the networking device 204, 206, and/or up to 208 may not provide the previous networking device identifying information in a peer discovery response, as the matching networking device identifying information may indicate that the networking device sending the peer discovery request 702 is actually the networking device 202.

For example, if a cable connecting the networking device 202 and the networking device 204 is moved from one port included in the communication system 308 in the networking device 202 to another port included in the communication system 308 in the networking device 202, then the networking device 204 may save the previous networking device identifying information in the replacement database 306 due to the connection being lost. However, when the networking device 202 sends the peer discovery request 702, the peer discovery request 702 may include the same MAC address that is included in the previous networking device identifying information and, as a result, the networking device 204 not sending a peer discovery response 708 that includes the previous networking device identifying information. Similarly, if a cable connecting the networking device 202 and the networking device 204 is moved from one port included in the communication system 308 in the networking device 204 to another port included in the communication system 308 in the networking device 204, then the previous networking device identifying information may not be sent in a peer discovery response 708.

In various embodiments, the replacement verification process may further include a condition that the networking devices 204, 206, and/or up to 208 determine whether the peer discovery request 702 was received on the same port included in the communication system 308 in the networking device 204, 206, and/or up to 208 to which the networking device 202 was coupled. For example, in the event the replacement networking device 214 is part of an RMA replacement associated with the networking device 202, the ports on the networking device 204, 206, and/or up to 208 that were connected to the networking device 202 should be subsequently connected to the replacement networking device 214, as the cables should simply be disconnected from the networking device 202 and reconnected to the replacement networking device 214. Thus, the networking devices 204, 206, and/or up to 208 may also require that the port identifiers of the ports on the networking devices 204, 206, and/or up to 208 that receive the peer discovery request 702 match the port identifiers mapped to the previous networking device identifying information in the replacement database 306. In the event those port identifiers do not match, then the networking devices 204, 206, and/or up to 208 may not send the previous networking device identifying information in the peer discovery response 708, as the non-matching port identifiers may indicate a topology change in the networking device replacement system 200.

In various embodiments, the replacement verification process may further include a condition that the networking devices 204, 206, and/or up to 208 determine whether the peer discovery request 702 includes replacement networking device identifying information that indicates that the replacement networking device 214 is the same type of networking device platform as the networking device 202. For example, in the event the replacement networking device 214 is part of an RMA replacement for the networking device 202, then the replacement networking device 214 should be the same networking device platform as the networking device 202 that is being replaced (i.e., the replacement networking device 214 should have the same manufacturer as the networking device 202, be the same model as the networking device 202, be the same type as the networking device 202, have the same capabilities as the networking device 202, etc.) As such, the replacement engine 304 in the networking device 204, 206, and/or up to 208 may compare the general networking device identifying information included in the replacement networking device identifying information that indicates a type of platform of the replacement networking device 214 to the general networking device identifying information included in the previous networking device identifying information to determine whether the replacement networking device 214 is part of the same networking device platform as the networking device 202. In the event the replacement networking device 214 is not part of the same networking device platform as the networking device 202, then the networking devices 204, 206, and/or up to 208 may not send the previous networking device identifying information in the peer discovery response 708, as different platform networking devices may indicate a topology change in the networking device replacement system 200.

In yet other embodiments, the replacement verification process may further include a condition that the replacement networking device 214 be in a provisioning mode (e.g., a BMP mode) before the networking devices 204, 206, and/or 208 send the peer discovery response 708. For example, in the event the replacement networking device 214 is part of an RMA replacement for the networking device 202, then the replacement networking device 214 should be in a provisioning mode when the peer discovery request 702 is sent by the replacement networking device 214. In some embodiments, in order to determine whether the replacement networking device 214 is in a provisioning mode, the networking device 204, 206, and/or up to 208 may "sniff" or otherwise detect configuration server discovery request packets (DHCP packets) sent from the replacement networking device 214, which may indicate that the replacement networking device 214 is in a provisioning mode. In the event the replacement networking device 214 is in a provisioning mode, then the networking devices 204, 206, and/or 208 may send the peer discovery response 708 that includes the previous networking device identifying information to the replacement networking device 214. In the event the replacement networking device 214 is not in a provisioning mode, then the networking devices 204, 206, and/or 208 may not send the peer discovery response 708, as the replacement networking device 214 not being in a provisioning mode may indicate a topology change in the networking device replacement system 200.

In various embodiments, the replacement verification process may further include a condition that the same conditions be satisfied on all ports of a networking device 204, 206, and/or up to 208 that are coupled to the replacement networking device 214 before that networking device 204, 206, and/or up to 208 sends the peer discovery response 708. For example, in the event the link 204a between networking device 204 to the replacement networking device 214 includes a first physical connection via the port 308a on the networking device 204 and a second physical connection via the port 308b on the networking device 204, then each of those ports 308a and 308b should receive a peer discovery request 702 from the replacement networking device 214 that includes the same replacement networking device identifying information. In the event one of the ports 308a and 308b on the networking device does not satisfy a condition monitored during the replacement verification process while the other networking device satisfies that condition, then the networking device 204 may not send the peer discovery response 708 via the port upon which that condition was satisfied. In the event all conditions are satisfied at each port in the link 204a, then the networking device 204 may send the peer discovery response 708 via each connection of the link 204a (e.g., via each of the ports 308a and 308b.) However, while specific conditions have been illustrated and described that are required to be satisfied before providing a peer discovery response 708 to the replacement networking device 214, one of skill in the art in possession of the present disclosure will recognize that other conditions may be required for the replacement verification process while remaining within the scope of the present disclosure.

The method 500 then proceeds to block 512 where the replacement networking device sends a configuration server discovery request to the configuration server system that includes the previous networking device identifying information. In an embodiment, at block 512 and with reference to FIG. 7, the replacement engine 304 in the replacement networking device 214 may send a configuration server discovery request 710 to the configuration server system 212 via the network 210, with that configuration server discovery request 710 including the previous networking device identifying information that was received by the replacement networking device 214 in the peer discovery response 708. For example, the configuration server discovery request 710 may include a DHCP discovery packet that includes the MAC address and/or the hostname of the networking device 202. In various embodiments, the replacement networking device 214 may send the configuration server discovery request 710 in response to a condition being satisfied. For example, the replacement networking device 214 may only send the configuration server discovery request 710 if the replacement networking device 214 receives the peer discovery response 708 that includes the previous networking device identifying information from all of the networking devices 204, 206, and/or up to 208 that are peer connected devices. However, other conditions may be required to be satisfied before the replacement networking device 214 provides the configuration server discovery request 710 to the configuration server system 212 while remaining within the scope of the present disclosure as well. Furthermore, in some embodiments, the replacement networking device 214 may replace its own replacement networking device identifying information (e.g., MAC address and/or hostname) with the previous networking device identifying information (e.g., MAC address and/or hostname) as well.

The method 500 then proceeds to block 514 where the replacement networking device receives a networking device configuration file associated with the previous networking device from the configuration server system. In an embodiment, at block 514 and with reference to FIG. 7, the configuration engine 404 in the configuration server system 212 may receive the configuration server discovery request 710 with the previous networking device identifying information, and the configuration engine 404 in the configuration server system 212 may process that configuration server discovery request 710 to determine that a networking device configuration file 712 that is associated with the previous networking device identifying information is stored in the configuration database 406. The configuration engine 404 may then retrieve the networking device configuration file 712 and provide the networking device configuration file 712 to the replacement networking device 214 via the network 210. For example, the networking device configuration file 712 may be provided in a configuration server discovery response (e.g., a DHCP response), and the networking configuration file 712 may include the configuration for the ports, a global level switch configuration, protocol configuration information, and/or any other configuration data that would be apparent to one of skill in the art in possession of the present disclosure.

The method 500 then proceeds to block 516 where the replacement networking device configures the replacement networking device using at least one configuration in the networking device configuration file associated with the previous networking device. In an embodiment, at block 516 and with reference to FIG. 7, the replacement engine 304 of the replacement networking device 214 may configure the replacement networking device 214 with at least one configuration provided in the networking device configuration file 712. For example, the replacement networking device 214 may configure the ports in the replacement networking device 214 with a list of configurations provided in the configuration file, a global level configuration, various switching and routing protocols. As such, the replacement networking device 214 may be configured with a configuration that was present on the networking device 202 before the networking device 202 became unavailable, while allows for the completion of the RMA process without manual operations required by an administrator.

In various embodiments, after the replacement networking device 214 is configured with a configuration of the networking device 202, the replacement networking device 214 may provide a configuration server packet 714 (e.g., a DHCP packet) to the configuration server system 212 to update the previous networking device identifying information (e.g., the MAC address and/or the hostname associated with the networking device 202) that is associated with the networking device configuration file 712 for the networking device 202 with the replacement networking device identifying information (e.g., the MAC address and/or the hostname associated with the replacement networking device 214). In response, the configuration server system 212 may respond with an acknowledgement 716 that acknowledges that the previous networking device identifying information is updated with the replacement networking device identifying information. Furthermore, in some embodiments, the networking devices 204, 206, and up to 208 may update their LLDP databases with the replacement networking device identifying information associated with the replacement networking device 214.

Thus, systems and methods have been described that provide for configuration of a replacement networking device with a configuration for a networking device that has been removed from a network and replaced by the replacement networking device. Peer networking devices may save identifying information associated with the networking device when the networking device is removed from the network, and when the replacement networking device is coupled via the links to the peer networking devices that were previously coupled with the networking device that was removed from the network, and upon receiving a MAC address and/or hostname that is different than a MAC address and/or hostname in the identifying information associated with the networking device that was removed from the network, the peer networking devices may send the identifying information associated with the networking device that was removed from the network to the replacement networking device. The replacement networking device may use the identifying information to retrieve a configuration file associated with the networking device that was removed from the network from a configuration server system (e.g., a DHCP server) and use the configuration file to configure itself such that it has the same configuration as the networking device that it replaced. As such, the configuration of the replacement networking device may be automatic without manual configuration by an administrator when it replaces a networking device that has failed or otherwise needs to be removed from the network. This increases the speed at which the networking device is replaced, and reduces network traffic loss and network latency associated with a non-operating networking device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device replacement system, comprising:
a configuration server system;
a first networking device coupled to the configuration server system; and
a second networking device coupled to the configuration server system and the first networking device, wherein the second networking device is a replacement networking device for a third networking device that was previously coupled to the first networking device, and wherein the second networking device is configured to:
send a first peer discovery request to the first networking device, wherein the first peer discovery request includes second networking device identifying information associated with the second networking device;
receive, from the first networking device, a first peer discovery response that includes third networking device identifying information associated with the third networking device;
send a first configuration server discovery request to the configuration server system that includes the third networking device identifying information;
receive, from the configuration server system, a third networking device configuration file associated with the third networking device; and
configure the second networking device using at least one configuration in the third networking device configuration file.

2. The system of claim 1, further comprising:
a fourth networking device coupled to the second networking device, wherein the second networking device is configured to:
send a second peer discovery request to the fourth networking device, wherein the second peer discovery request includes the second networking device identifying information; and
receive, from the fourth networking device, a second peer discovery response that includes the third networking device identifying information, wherein the sending a first configuration server discovery request to the configuration server system that includes the third networking device identifying information is performed in response to the second networking device receiving the third networking device identifying information from both of the first networking device and the fourth networking device.

3. The system of claim 1, wherein the identifying information includes a hostname and a Media Access Control (MAC) address.

4. The system of claim 1, wherein the first peer discovery request includes an Link Layer Discovery Protocol (LLDP) packet, and wherein the first configuration server discovery request includes a Dynamic Host Configuration Protocol (DHCP) packet.

5. The system of claim 1, wherein the first peer discovery response includes a modified Time Length Value (TLV) message that includes the third networking device identifying information.

6. The system of claim 1, wherein the second networking device is configured to:
provide, subsequent to the configuring the second networking device using the at least one configuration in the third networking device configuration file, the second networking device identifying information to the configuration server system to cause the configuration server system to replace the third networking device identifying information with the second networking device identifying information.

7. The system of claim 1, wherein the second networking device is configured to:
detect, subsequent to the configuring the second networking device using the at least one configuration in the third networking device configuration file, that a link between the first networking device and the second networking device has gone down; and
save first networking device identifying information associated with the first networking device as recovery identifying information, and a port identifier of a port included on the second networking device on which the link was established.

8. The system of claim 7, wherein the second networking device is configured to:
receive, on the port, a second peer discovery request from a fifth networking device that includes fifth networking device identifying information associated with the fifth networking device; and
determine that the fifth networking device identifying information does not correspond to the first networking device identifying information and, in response, send the first networking device identifying information through the port to the fifth networking device.

9. The system of claim 8, wherein the sending the first networking device identifying information through the port to the fifth networking device is performed in response to determining from the fifth networking device identifying information that the fifth networking device is in a provisioning mode and is the same type of networking device as the first networking device.

10. An Information Handling System (IHS), comprising:
a processing system; and
a memory system that is coupled to the processing system and that includes instructions that, when executed by the processing system, cause the processing system to provide a replacement engine configured to:
send a first peer discovery request to a first networking device, wherein the first peer discovery request includes IHS identifying information associated with the IHS;
receive, from the first networking device, a first peer discovery response that includes second networking device identifying information associated with a second networking device;
send a first configuration server discovery request to a configuration server system that includes the second networking device identifying information;
receive, from the configuration server system, a second networking device configuration file associated with the second networking device; and
configure the IHS using at least one configuration in the second networking device configuration file.

11. The IHS of claim 10, wherein the replacement engine configured to:
send a second peer discovery request to a third networking device, wherein the second peer discovery request includes the IHS identifying information; and
receive, from the third networking device, a second peer discovery response that includes the second networking device identifying information, wherein the replacing the IHS identifying information with the second networking device identifying information is performed in response to the IHS receiving the second networking device identifying information from both of the first networking device and the third networking device.

12. The IHS of claim 10, wherein the identifying information includes a hostname and a Media Access Control (MAC) address.

13. The IHS of claim 10, wherein the first peer discovery response includes a modified Time Length Value (TLV) message that includes the second networking device identifying information.

14. The IHS of claim 10, wherein the replacement engine configured to:
provide, subsequent to the configuring the IHS using the at least one configuration in the second networking device configuration file, the IHS identifying information to the configuration server system to cause the configuration server system to replace the second networking device identifying information with the IHS identifying information.

15. The IHS of claim 10, wherein the replacement engine configured to:
   detect, subsequent to the configuring the IHS using the at least one configuration in the second networking device configuration file, that a link between the first networking device and the IHS has gone down; and
   save first networking device identifying information associated with the first networking device as previous networking device identifying information, and a port identifier of a port included on the IHS on which the link was established.

16. The IHS of claim 15, wherein the replacement engine configured to:
   receive, on the port, a second peer discovery request from a fourth networking device that includes fourth networking device identifying information associated with the fourth networking device; and
   determine that the fourth networking device identifying information does not correspond to the first networking device identifying information and, in response, send the first networking device identifying information through the port to the fourth networking device.

17. A method of replacing a networking device on a network, comprising:
   sending, by a replacement networking device, a first peer discovery request to a first networking device, wherein the first peer discovery request includes replacement networking device identifying information associated with the replacement networking device;
   receiving, by the replacement networking device and from the first networking device, a first peer discovery response that includes second networking device identifying information associated with a second networking device;
   sending, by the replacement networking device to a configuration server system, a first configuration server discovery request that includes the second networking device identifying information;
   receiving, by the replacement networking device from the configuration server system, a second networking device configuration file associated with the second networking device; and
   configuring, by the replacement networking device, the replacement networking device using at least one configuration in the second networking device configuration file.

18. The method of claim 17, further comprising:
   sending, by the replacement networking device, a second peer discovery request to a third networking device, wherein the second peer discovery request includes the replacement networking device identifying information; and
   receiving, by the replacement networking device from the third networking device, a second peer discovery response that includes the second networking device identifying information, wherein the replacing the replacement networking device identifying information with the second networking device identifying information is performed in response to the replacement networking device receiving the second networking device identifying information from both of the first networking device and the third networking device.

19. The method of claim 17, further comprising:
   providing, by the replacement networking device and subsequent to the configuring the replacement networking device using the at least one configuration in the second networking device configuration file, the replacement networking device identifying information to the configuration server system to cause the configuration server system to replace the second networking device identifying information with the replacement networking device identifying information.

20. The method of claim 17, further comprising:
   detecting, by the replacement networking device and subsequent to the configuring the replacement networking device using the at least one configuration in the second networking device configuration file, that a link between the first networking device and the replacement networking device has gone down; and
   saving, by the replacement networking device, first networking device identifying information associated with the first networking device as previous networking device identifying information, and a port identifier of a port included on the replacement networking device on which the link was established.

* * * * *